United States Patent
Grafenauer et al.

(10) Patent No.: US 7,908,816 B2
(45) Date of Patent: Mar. 22, 2011

(54) DEVICE FOR CONNECTING BUILDING BOARDS, ESPECIALLY FLOOR PANELS

(75) Inventors: Thomas Grafenauer, Onzour sur Loire (FR); Matthias Lewark, Kremmen (DE)

(73) Assignee: Kronotec AG, Lucerne (CH)

( * ) Notice: Subject to any disclaimer, the term of this patent is extended or adjusted under 35 U.S.C. 154(b) by 589 days.

(21) Appl. No.: 10/550,607

(22) PCT Filed: Jan. 30, 2004

(86) PCT No.: PCT/DE2004/000148
§ 371 (c)(1),
(2), (4) Date: Nov. 29, 2005

(87) PCT Pub. No.: WO2004/085765
PCT Pub. Date: Oct. 7, 2004

(65) Prior Publication Data
US 2007/0028547 A1 Feb. 8, 2007

(30) Foreign Application Priority Data
Mar. 24, 2003 (DE) .............. 203 04 761 U

(51) Int. Cl.
*E04C 3/00* (2006.01)
*E04B 5/00* (2006.01)
*E04B 2/00* (2006.01)

(52) U.S. Cl. ...... 52/586.2; 52/586.1; 52/471; 52/506.05

(58) Field of Classification Search .......... 52/586.1, 52/586.2, 506.05, 471; 411/460
See application file for complete search history.

(56) References Cited

U.S. PATENT DOCUMENTS

| | | |
|---|---|---|
| 213,740 A | 4/1879 | Conner |
| 623,562 A | 4/1899 | Rider |
| 714,987 A | 12/1902 | Wolfe |

(Continued)

FOREIGN PATENT DOCUMENTS

AT 005566 8/2002

(Continued)

OTHER PUBLICATIONS

Webster Dictionary, p. 862.

(Continued)

*Primary Examiner* — David Dunn
*Assistant Examiner* — Elizabeth A Plummer
(74) *Attorney, Agent, or Firm* — Andrew M. Calderon; Roberts Mlotkowski Safran & Cole, P.C.

(57) ABSTRACT

Disclosed is a device for connecting and locking building boards comprising a top face (10) and a bottom face (11), especially floor panels (1, 2) that are provided with a core made of a wood material as well as a groove (3, 4; 5, 6; 18, 19) on two opposite lateral edges (I, II). Said building boards further comprise an insert (7; 8; 9) that is used for locking and can be inserted into the groove (3 or 4; 5, 6; 18, or 19) of one of the lateral edges (I, II). The boards (1, 2) are connected by displacing the boards in an essentially horizontal direction (Q) towards each other. The inventive device is characterized in that the insert (7; 8; 9; 17) is provided with at least one springy lip (7a, 8a; 9a; 17a) which extends towards the top face (10) or the bottom face (11).

28 Claims, 11 Drawing Sheets

U.S. PATENT DOCUMENTS

| | | | |
|---|---|---|---|
| 753,791 A | 3/1904 | Fulghum | |
| 1,124,228 A | 1/1915 | Houston | |
| 1,407,679 A | 2/1922 | Ruthrauff | |
| 1,454,250 A | 5/1923 | Parsons | |
| 1,468,288 A | 9/1923 | Een | |
| 1,477,813 A | 12/1923 | Daniels | |
| 1,510,924 A | 10/1924 | Daniels et al. | |
| 1,540,128 A | 6/1925 | Houston | |
| 1,575,821 A | 3/1926 | Daniels | |
| 1,602,256 A | 10/1926 | Sellin | |
| 1,602,267 A | 10/1926 | Karwisch | |
| 1,615,096 A | 1/1927 | Meyers | |
| 1,622,103 A | 3/1927 | Fulton | |
| 1,622,104 A | 3/1927 | Fulton | |
| 1,637,634 A | 8/1927 | Carter | |
| 1,644,710 A | 10/1927 | Crooks | |
| 1,660,480 A | 2/1928 | Daniels | |
| 1,714,738 A | 5/1929 | Smith | |
| 1,718,702 A | 6/1929 | Pfiester | |
| 1,734,826 A | 11/1929 | Pick | |
| 1,764,331 A | 6/1930 | Moratz | |
| 1,776,188 A | 9/1930 | Langb'aum | |
| 1,778,069 A | 10/1930 | Fetz | |
| 1,779,729 A | 10/1930 | Bruce | |
| 1,787,027 A | 12/1930 | Wasleff | |
| 1,823,039 A | 9/1931 | Gruner | |
| 1,859,667 A | 5/1932 | Gruner | |
| 1,898,364 A | 2/1933 | Gynn | |
| 1,906,411 A | 5/1933 | Potvin | |
| 1,921,164 A | 8/1933 | Lewis | |
| 1,929,871 A | 10/1933 | Jones | |
| 1,940,377 A | 12/1933 | Storm | |
| 1,946,648 A | 2/1934 | Taylor | |
| 1,953,306 A | 4/1934 | Moratz | |
| 1,986,739 A | 1/1935 | Mitte | |
| 1,988,201 A | 1/1935 | Hall | |
| 2,023,066 A | 12/1935 | Curtis et al. | |
| 2,044,216 A | 6/1936 | Klages | |
| 2,065,525 A | 12/1936 | Hamilton | |
| 2,123,409 A | 7/1938 | Elmendorf | |
| 2,220,606 A | 11/1940 | Malarkey et al. | |
| 2,276,071 A | 3/1942 | Scull | |
| 2,280,071 A | 4/1942 | Hamilton | |
| 2,324,628 A | 7/1943 | Kähr | |
| 2,328,051 A | 8/1943 | Bull | |
| 2,398,632 A | 4/1946 | Frost et al. | |
| 2,430,200 A | 11/1947 | Wilson | |
| 2,740,167 A | 4/1956 | Rowley | |
| 2,863,185 A * | 12/1958 | Riedi | 403/297 |
| 2,894,292 A | 7/1959 | Gramelspacker | |
| 3,045,294 A | 7/1962 | Livezey, Jr. | |
| 3,100,556 A | 8/1963 | De Ridder | |
| 3,125,138 A | 3/1964 | Bolenbach | |
| 3,182,769 A | 5/1965 | De Ridder | |
| 3,203,149 A | 8/1965 | Soddy | |
| 3,204,380 A | 9/1965 | Smith et al. | |
| 3,267,630 A | 8/1966 | Omholt | |
| 3,282,010 A | 11/1966 | King, Jr. | |
| 3,310,919 A | 3/1967 | Bue et al. | |
| 3,347,048 A | 10/1967 | Brown et al. | |
| 3,460,304 A | 8/1969 | Braeuninger et al. | |
| 3,481,810 A | 12/1969 | Waite | |
| 3,526,420 A | 9/1970 | Brancaleone | |
| 3,538,665 A | 11/1970 | Gohner | |
| 3,553,919 A | 1/1971 | Omholt | |
| 3,555,762 A | 1/1971 | Costanzo, Jr. | |
| 3,608,258 A | 9/1971 | Spratt | |
| 3,627,362 A | 12/1971 | Brenneman | |
| 3,694,983 A | 10/1972 | Couquet | |
| 3,714,747 A | 2/1973 | Curran | |
| 3,720,027 A | 3/1973 | Christensen | |
| 3,731,445 A | 5/1973 | Hoffmann et al. | |
| 3,759,007 A | 9/1973 | Thiele | |
| 3,760,547 A | 9/1973 | Brenneman | |
| 3,760,548 A | 9/1973 | Sauer et al. | |
| 3,768,846 A | 10/1973 | Hensley et al. | |
| 3,859,000 A | 1/1975 | Webster | |
| 3,878,030 A | 4/1975 | Cook | |
| 3,902,293 A | 9/1975 | Witt et al. | |
| 3,908,053 A | 9/1975 | Hettich | |
| 3,936,551 A | 2/1976 | Elmendorf et al. | |
| 3,988,187 A | 10/1976 | Witt et al. | |
| 4,006,048 A | 2/1977 | Cannady, Jr. et al. | |
| 4,090,338 A | 5/1978 | Bourgade | |
| 4,091,136 A | 5/1978 | O'Brian et al. | |
| 4,099,358 A | 7/1978 | Compaan | |
| 4,118,533 A | 10/1978 | Hipchen et al. | |
| 4,131,705 A | 12/1978 | Kubinsky | |
| 4,164,832 A | 8/1979 | Van Zandt | |
| 4,169,688 A | 10/1979 | Toshio | |
| 4,242,390 A | 12/1980 | Nemeth | |
| 4,243,716 A | 1/1981 | Kosaka et al. | |
| 4,245,689 A | 1/1981 | Grard et al. | |
| 4,246,310 A | 1/1981 | Hunt et al. | |
| 4,290,248 A | 9/1981 | Kemerer et al. | |
| 4,299,070 A | 11/1981 | Oltmanns et al. | |
| 4,426,820 A | 1/1984 | Terbrack et al. | |
| 4,431,044 A | 2/1984 | Bruneau | |
| 4,471,012 A | 9/1984 | Maxwell | |
| 4,501,102 A | 2/1985 | Knowles | |
| 4,561,233 A | 12/1985 | Harter et al. | |
| 4,585,685 A | 4/1986 | Forry et al. | |
| 4,599,841 A * | 7/1986 | Haid | 52/396.04 |
| 4,612,745 A | 9/1986 | Hovde | |
| 4,641,469 A | 2/1987 | Wood | |
| 4,653,242 A | 3/1987 | Ezard | |
| 4,654,244 A | 3/1987 | Eckert et al. | |
| 4,703,597 A | 11/1987 | Eggemar | |
| 4,715,162 A | 12/1987 | Brightwell | |
| 4,738,071 A | 4/1988 | Ezard | |
| 4,752,497 A | 6/1988 | McConkey et al. | |
| 4,769,963 A | 9/1988 | Meyerson | |
| 4,819,932 A | 4/1989 | Trotter, Jr. | |
| 4,831,806 A | 5/1989 | Niese et al. | |
| 4,845,907 A | 7/1989 | Meek | |
| 4,905,442 A | 3/1990 | Daniels | |
| 4,947,602 A | 8/1990 | Pollasky | |
| 5,029,425 A | 7/1991 | Bogataj | |
| 5,086,599 A * | 2/1992 | Meyerson | 52/309.9 |
| 5,103,614 A | 4/1992 | Kawaguchi et al. | |
| 5,113,632 A | 5/1992 | Hanson | |
| 5,117,603 A | 6/1992 | Weintraub | |
| 5,136,823 A | 8/1992 | Pellegrino | |
| 5,165,816 A | 11/1992 | Parasin | |
| 5,179,812 A | 1/1993 | Hill | |
| 5,205,091 A | 4/1993 | Brown | |
| 5,216,861 A | 6/1993 | Meyerson | |
| 5,247,773 A | 9/1993 | Weir | |
| 5,251,996 A | 10/1993 | Hiller et al. | |
| 5,253,464 A | 10/1993 | Nilsen | |
| 5,283,102 A | 2/1994 | Sweet et al. | |
| 5,295,341 A | 3/1994 | Kajiwara | |
| 5,335,473 A | 8/1994 | Chase | |
| 5,348,778 A | 9/1994 | Knipp et al. | |
| 5,349,796 A | 9/1994 | Meyerson | |
| 5,390,457 A | 2/1995 | Sjölander | |
| 5,413,834 A | 5/1995 | Hunter et al. | |
| 5,426,822 A | 6/1995 | Weir | |
| 5,433,806 A | 7/1995 | Pasquali et al. | |
| 5,474,831 A | 12/1995 | Nystrom | |
| 5,497,589 A | 3/1996 | Porter | |
| 5,502,939 A | 4/1996 | Zadok et al. | |
| 5,540,025 A | 7/1996 | Takehara et al. | |
| 5,567,497 A | 10/1996 | Zegler et al. | |
| 5,570,554 A | 11/1996 | Searer | |
| 5,597,024 A | 1/1997 | Bolyard et al. | |
| 5,630,304 A | 5/1997 | Austin | |
| 5,653,099 A | 8/1997 | MacKenzie | |
| 5,671,575 A | 9/1997 | Wu | |
| 5,694,734 A | 12/1997 | Cercone et al. | |
| 5,706,621 A | 1/1998 | Pervan | |
| 5,736,227 A | 4/1998 | Sweet et al. | |
| 5,768,850 A | 6/1998 | Chen | |
| 5,797,175 A | 8/1998 | Schneider | |
| 5,797,237 A | 8/1998 | Finkell, Jr. | |
| 5,823,240 A | 10/1998 | Bolyard et al. | |
| 5,827,592 A | 10/1998 | Van Gulik et al. | |

| | | | | | | |
|---|---|---|---|---|---|---|
| 5,860,267 A | 1/1999 | Pervan | | 6,682,254 B1 | 1/2004 | Olofsson et al. |
| 5,935,668 A | 8/1999 | Smith | | 6,685,993 B1 | 2/2004 | Hansson et al. |
| 5,943,239 A | 8/1999 | Shamblin et al. | | 6,711,864 B2 | 3/2004 | Erwin |
| 5,953,878 A | 9/1999 | Johnson | | 6,711,869 B2 | 3/2004 | Tychsen |
| 5,968,625 A | 10/1999 | Hudson | | 6,715,253 B2 | 4/2004 | Pervan |
| 5,985,397 A | 11/1999 | Witt et al. | | 6,723,438 B2 | 4/2004 | Chang et al. |
| 5,987,839 A | 11/1999 | Hamar et al. | | 6,729,091 B1 | 5/2004 | Martensson |
| 6,006,486 A | 12/1999 | Moriau et al. | | 6,745,534 B2 | 6/2004 | Kornfalt |
| 6,023,907 A | 2/2000 | Pervan | | 6,761,008 B2 | 7/2004 | Chen et al. |
| 6,065,262 A | 5/2000 | Motta | | 6,761,794 B2 | 7/2004 | Mott et al. |
| 6,094,882 A | 8/2000 | Pervan | | 6,763,643 B1 | 7/2004 | Martensson |
| 6,101,778 A | 8/2000 | Martensson | | 6,766,622 B1 | 7/2004 | Thiers |
| 6,119,423 A | 9/2000 | Costantino | | 6,769,217 B2 | 8/2004 | Nelson |
| 6,134,854 A | 10/2000 | Stanchfield | | 6,769,218 B2 | 8/2004 | Pervan |
| 6,148,884 A | 11/2000 | Bolyard et al. | | 6,769,835 B2 | 8/2004 | Stridsman |
| 6,168,866 B1 | 1/2001 | Clark | | 6,772,568 B2 | 8/2004 | Thiers et al. |
| 6,182,410 B1 | 2/2001 | Pervan | | 6,786,019 B2 | 9/2004 | Thiers |
| 6,186,703 B1 | 2/2001 | Shaw | | 6,803,109 B2 | 10/2004 | Qiu et al. |
| 6,205,639 B1 | 3/2001 | Pervan | | 6,805,951 B2 | 10/2004 | Kornfält et al. |
| 6,209,278 B1 | 4/2001 | Tychsen | | 6,823,638 B2 | 11/2004 | Stanchfield |
| 6,216,403 B1 | 4/2001 | Belbeoc'h | | 6,841,023 B2 | 1/2005 | Mott |
| 6,216,409 B1 | 4/2001 | Roy et al. | | 2001/0029720 A1 | 10/2001 | Pervan |
| D442,296 S | 5/2001 | Külik | | 2001/0034992 A1 | 11/2001 | Pletzer et al. |
| D442,297 S | 5/2001 | Külik | | 2002/0007608 A1 | 1/2002 | Pervan |
| D442,298 S | 5/2001 | Külik | | 2002/0007609 A1 | 1/2002 | Pervan |
| D442,706 S | 5/2001 | Külik | | 2002/0014047 A1 | 2/2002 | Thiers |
| D442,707 S | 5/2001 | Külik | | 2002/0020127 A1 | 2/2002 | Thiers et al. |
| 6,224,698 B1 | 5/2001 | Endo | | 2002/0046528 A1 | 4/2002 | Pervan et al. |
| 6,238,798 B1 | 5/2001 | Kang et al. | | 2002/0056245 A1 | 5/2002 | Thiers |
| 6,247,285 B1 | 6/2001 | Moebus | | 2002/0106439 A1 | 8/2002 | Cappelle |
| D449,119 S | 10/2001 | Külik | | 2002/0160680 A1 | 10/2002 | Laurence et al. |
| D449,391 S | 10/2001 | Külik | | 2003/0024200 A1 | 2/2003 | Moriau et al. |
| D449,392 S | 10/2001 | Külik | | 2003/0024201 A1 | 2/2003 | Moriau et al. |
| 6,324,803 B1 | 12/2001 | Pervan | | 2003/0029115 A1 | 2/2003 | Moriau et al. |
| 6,345,481 B1 | 2/2002 | Nelson | | 2003/0029116 A1 | 2/2003 | Moriau et al. |
| 6,363,677 B1 | 4/2002 | Chen et al. | | 2003/0029117 A1 | 2/2003 | Moriau et al. |
| 6,397,547 B1 | 6/2002 | Martensson | | 2003/0033777 A1 | 2/2003 | Thiers et al. |
| 6,418,683 B1 | 7/2002 | Martensson et al. | | 2003/0033784 A1 | 2/2003 | Pervan |
| 6,421,970 B1 | 7/2002 | Martensson et al. | | 2003/0115812 A1 | 6/2003 | Pervan |
| 6,427,408 B1 | 8/2002 | Krieger | | 2003/0115821 A1 | 6/2003 | Pervan |
| 6,436,159 B1 | 8/2002 | Safta et al. | | 2003/0159385 A1 | 8/2003 | Thiers |
| 6,438,919 B1 | 8/2002 | Knauseder | | 2003/0167717 A1 | 9/2003 | Garcia |
| 6,446,405 B1 | 9/2002 | Pervan | | 2003/0196405 A1 | 10/2003 | Pervan |
| 6,449,913 B1 | 9/2002 | Shelton | | 2003/0205013 A1 | 11/2003 | Garcia |
| 6,449,918 B1 | 9/2002 | Nelson | | 2003/0233809 A1 | 12/2003 | Pervan |
| 6,453,632 B1 | 9/2002 | Huang | | 2004/0016196 A1 | 1/2004 | Pervan |
| 6,458,232 B1 | 10/2002 | Valentinsson | | 2004/0035078 A1 | 2/2004 | Pervan |
| 6,460,306 B1 | 10/2002 | Nelson | | 2004/0092006 A1 | 5/2004 | Lindekens et al. |
| 6,461,636 B1 | 10/2002 | Arth et al. | | 2004/0105994 A1 | 6/2004 | Lu et al. |
| 6,465,046 B1 | 10/2002 | Hansson et al. | | 2004/0139678 A1 | 7/2004 | Pervan |
| 6,490,836 B1 | 12/2002 | Moriau et al. | | 2004/0159066 A1 | 8/2004 | Thiers et al. |
| 6,497,961 B2 | 12/2002 | Kang et al. | | 2004/0177584 A1 | 9/2004 | Pervan |
| 6,510,665 B2 | 1/2003 | Pervan | | 2004/0200165 A1 | 10/2004 | Garcia et al. |
| 6,516,579 B1 | 2/2003 | Pervan | | 2004/0206036 A1 | 10/2004 | Pervan |
| 6,517,935 B1 | 2/2003 | Kornfalt et al. | | 2004/0237447 A1 | 12/2004 | Thiers et al. |
| 6,519,912 B1 | 2/2003 | Eckmann et al. | | 2004/0237448 A1 | 12/2004 | Thiers et al. |
| 6,521,314 B2 | 2/2003 | Tychsen | | 2004/0241374 A1 | 12/2004 | Thiers et al. |
| 6,532,709 B2 | 3/2003 | Pervan | | 2004/0244322 A1 | 12/2004 | Thiers et al. |
| 6,533,855 B1 | 3/2003 | Gaynor et al. | | 2004/0250493 A1 | 12/2004 | Thiers et al. |
| 6,536,178 B1 | 3/2003 | Pålsson et al. | | 2004/0255541 A1 | 12/2004 | Thiers et al. |
| 6,546,691 B2 | 4/2003 | Peopolder | | 2004/0258907 A1 | 12/2004 | Kornfalt et al. |
| 6,553,724 B1 | 4/2003 | Bigler | | 2005/0003149 A1 | 1/2005 | Kornfalt et al. |
| 6,558,754 B1 | 5/2003 | Velin et al. | | 2005/0016099 A1 | 1/2005 | Thiers |
| 6,565,919 B1 | 5/2003 | Hansson et al. | | | | |
| 6,569,272 B2 | 5/2003 | Tychsen | | | | |
| 6,588,166 B2 | 7/2003 | Martensson et al. | | | | |
| 6,591,568 B1 | 7/2003 | Palsson | | | | |

FOREIGN PATENT DOCUMENTS

| | | |
|---|---|---|
| AU | 713628 | 5/1998 |
| AU | 200020703 | 1/2000 |
| BE | 417526 | 9/1936 |
| BE | 557844 | 6/1957 |
| BE | 557844 | 3/1960 |
| BE | 09600527 | 6/1998 |
| BE | 09700344 | 10/1998 |
| CA | 991373 | 6/1976 |
| CA | 2226286 | 12/1997 |
| CA | 2252791 | 5/1999 |
| CA | 2289309 | 7/2000 |
| CH | 200949 | 1/1939 |

| | | | |
|---|---|---|---|
| 6,601,359 B2 | 8/2003 | Olofsson | |
| 6,606,834 B2 | 8/2003 | Martensson et al. | |
| 6,617,009 B1 | 9/2003 | Chen et al. | |
| 6,635,174 B1 | 10/2003 | Berg et al. | |
| 6,641,629 B2 | 11/2003 | Muselman et al. | |
| 6,646,088 B2 | 11/2003 | Fan et al. | |
| 6,647,690 B1 | 11/2003 | Martensson | |
| 6,649,687 B1 | 11/2003 | Gheewala et al. | |
| 6,659,097 B1 | 12/2003 | Houston | |
| 6,672,030 B2 | 1/2004 | Schulte | |
| 6,675,545 B2 | 1/2004 | Chen et al. | |
| 6,681,820 B2 | 1/2004 | Olofsson | |

| | | | | | | |
|---|---|---|---|---|---|---|
| CH | 211877 | 1/1941 | | FR | 2 209 024 | 6/1974 |
| CH | 562377 | 5/1975 | | FR | 2691491 | 11/1983 |
| DE | 314207 | 9/1919 | | FR | 2568295 | 5/1986 |
| DE | 531989 | 8/1931 | | FR | 2623544 | 5/1989 |
| DE | 740235 | 10/1943 | | FR | 2630149 | 10/1989 |
| DE | 1089966 | 9/1960 | | FR | 2637932 | 4/1990 |
| DE | 1534278 | 2/1966 | | FR | 2675174 | 10/1991 |
| DE | 1212225 | 3/1966 | | FR | 2667639 | 4/1992 |
| DE | 1212275 | 3/1966 | | FR | 2691491 | 11/1993 |
| DE | 1534802 | 4/1970 | | FR | 2697275 | 4/1994 |
| DE | 7102476 | 6/1971 | | FR | 2712329 | 5/1995 |
| DE | 2007129 | 9/1971 | | FR | 2776956 | 10/1999 |
| DE | 1534278 | 11/1971 | | FR | 2781513 | 1/2000 |
| DE | 2252643 | 10/1972 | | FR | 2785633 | 5/2000 |
| DE | 2238660 | 2/1974 | | FR | 2810060 | 12/2001 |
| DE | 7402354 | 5/1974 | | GB | 424057 | 2/1935 |
| DE | 2502992 | 7/1976 | | GB | 585205 | 1/1947 |
| DE | 2616077 | 10/1977 | | GB | 599793 | 3/1948 |
| DE | 2917025 | 11/1980 | | GB | 636423 | 4/1950 |
| DE | 7911924 | 3/1981 | | GB | 812671 | 4/1959 |
| DE | 7928703 | 5/1981 | | GB | 1033866 | 6/1966 |
| DE | 3041781 | 6/1982 | | GB | 1034117 | 6/1966 |
| DE | 3214207 | 11/1982 | | GB | 1044846 | 10/1966 |
| DE | 8226153 | 1/1983 | | GB | 1237744 | 6/1968 |
| DE | 3343601 | 6/1985 | | GB | 1127915 | 9/1968 |
| DE | 86040049 | 6/1986 | | GB | 1275511 | 5/1972 |
| DE | 3512204 | 10/1986 | | GB | 1399402 | 7/1975 |
| DE | 3246376 | 2/1987 | | GB | 1430423 | 3/1976 |
| DE | 4004891 | 9/1990 | | GB | 2117813 | 10/1983 |
| DE | 4002547 | 8/1991 | | GB | 2126106 | 3/1984 |
| DE | 39 32 980 A1 | 11/1991 | | GB | 2152063 | 7/1985 |
| DE | 4134452 | 4/1993 | | GB | 2238660 | 6/1991 |
| DE | 4215273 | 11/1993 | | GB | 2243381 | 10/1991 |
| DE | 4242530 | 6/1994 | | GB | 2256023 | 11/1992 |
| DE | 4011656 | 1/1995 | | JP | 54-65528 | 5/1979 |
| DE | 4324137 | 1/1995 | | JP | 57-119056 | 7/1982 |
| DE | 4107151 | 2/1995 | | JP | 59-186336 | 10/1984 |
| DE | 29517128 | 2/1996 | | JP | 3-169967 | 7/1991 |
| DE | 4242530 | 9/1996 | | JP | 4-106264 | 4/1992 |
| DE | 3544845 | 12/1996 | | JP | 5-148984 | 6/1993 |
| DE | 29710175 | 9/1997 | | JP | 6-56310 | 5/1994 |
| DE | 19616510 | 3/1998 | | JP | 6-146553 | 5/1994 |
| DE | 19651149 | 6/1998 | | JP | 6-200611 | 7/1994 |
| DE | 19709641 | 9/1998 | | JP | 6-320510 | 11/1994 |
| DE | 19718319 | 11/1998 | | JP | 7-76923 | 3/1995 |
| DE | 19735189 | 6/2000 | | JP | 7-180333 | 7/1995 |
| DE | 20001225 | 8/2000 | | JP | 7-300979 | 11/1995 |
| DE | 19925248 | 12/2000 | | JP | 7-310426 | 11/1995 |
| DE | 20017461 | 3/2001 | | JP | 8-109734 | 4/1996 |
| DE | 20018284 | 3/2001 | | JP | 8-270193 | 10/1996 |
| DE | 100 34 409 A1 | 1/2002 | | NE | 7601773 | 2/1976 |
| DE | 20206460 | 8/2002 | | NO | 157871 | 2/1988 |
| DE | 20218331 | 5/2004 | | NO | 305614 | 6/1999 |
| EP | 0248127 | 12/1987 | | SE | 7114900-9 | 9/1974 |
| EP | 0623724 | 11/1994 | | SE | 450411 | 6/1987 |
| EP | 0652340 | 5/1995 | | SE | 450141 | 9/1987 |
| EP | 0667936 | 8/1995 | | SE | 501014 | 10/1994 |
| EP | 0690185 | 1/1996 | | SE | 501914 | 6/1995 |
| EP | 0849416 | 6/1998 | | SE | 502994 | 4/1996 |
| EP | 0698162 | 9/1998 | | SE | 506254 | 11/1997 |
| EP | 0903451 | 3/1999 | | SE | 509059 | 11/1998 |
| EP | 0855482 | 12/1999 | | SE | 509060 | 11/1998 |
| EP | 0877130 | 1/2000 | | SE | 512290 | 2/2000 |
| EP | 0961964 | 1/2000 | | SE | 512313 | 2/2000 |
| EP | 0969163 | 1/2000 | | SE | 0000200-6 | 8/2001 |
| EP | 0969164 | 1/2000 | | SU | 363795 | 12/1972 |
| EP | 0974713 | 1/2000 | | WO | 84/02155 | 6/1984 |
| EP | 0843763 | 10/2000 | | WO | 87/03839 | 7/1987 |
| EP | 1200690 | 5/2002 | | WO | 89/08539 | 9/1989 |
| EP | 0958441 | 7/2003 | | WO | 92/17657 | 10/1992 |
| EP | 1026341 | 8/2003 | | WO | 93/13280 | 7/1993 |
| ES | 163421 | 9/1968 | | WO | 93/19910 | 10/1993 |
| ES | 460194 | 5/1978 | | WO | 94/01628 | 1/1994 |
| ES | 283331 | 5/1985 | | WO | 94/26999 | 11/1994 |
| ES | 1019585 | 12/1991 | | WO | 9426999 | 11/1994 |
| ES | 1019585 | 1/1992 | | WO | 95/06176 | 3/1995 |
| ES | 2168045 | 5/2002 | | | | |
| FI | 843060 | 8/1984 | | | | |
| FR | 1293043 | 4/1962 | | | | |

| | | |
|---|---|---|
| WO | 96/27719 | 9/1996 |
| WO | 96/27721 | 9/1996 |
| WO | 96/30177 | 10/1996 |
| WO | 97/47834 | 12/1997 |
| WO | 98/24495 | 6/1998 |
| WO | 98/24994 | 6/1998 |
| WO | 98/38401 | 9/1998 |
| WO | 9940273 | 8/1999 |
| WO | 99/66151 | 12/1999 |
| WO | 9966152 | 12/1999 |
| WO | 0006854 | 2/2000 |
| WO | 00/20705 | 4/2000 |
| WO | 0066856 | 11/2000 |
| WO | 0166876 | 9/2001 |

OTHER PUBLICATIONS

Opposition II EPO. 698. 162—Facts—Arguments Evidence (11 pages)—translation.

U.S. Court of Appeals for the Federal Circuit, 02-1222-1291 *Alloc, Inc.* vs. *International Trade Commission*, pp. 1-32.

U.S. Court of Appeals for the Federal Circuit Decision in *Alloc, Inc. et al.* vs. *International Trade Commission and Pergs, Inc. et al.* decided Sep. 10, 2003.

PCT/DE2004/000148—International Search Report.

PCT/DE2004/000148—Written Opinion.

English Language abstract FR 2810060.

\* cited by examiner

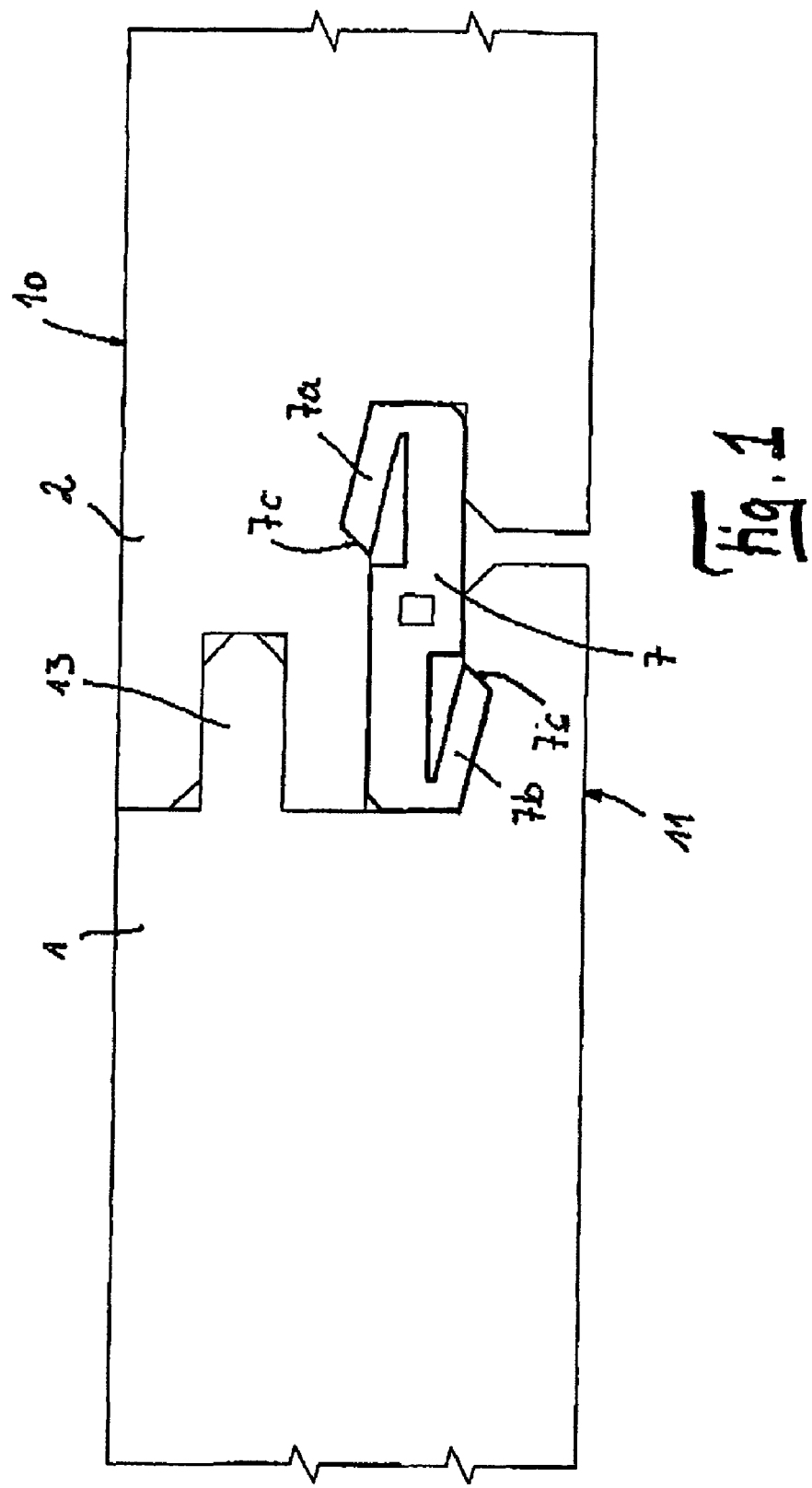

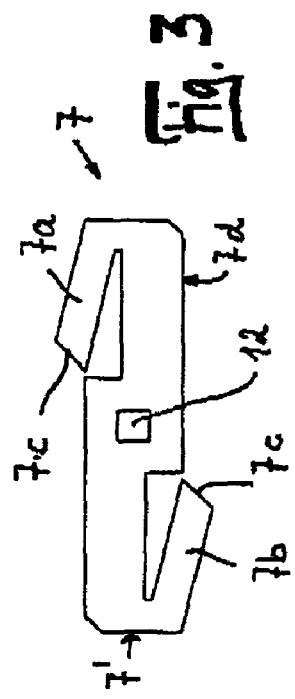
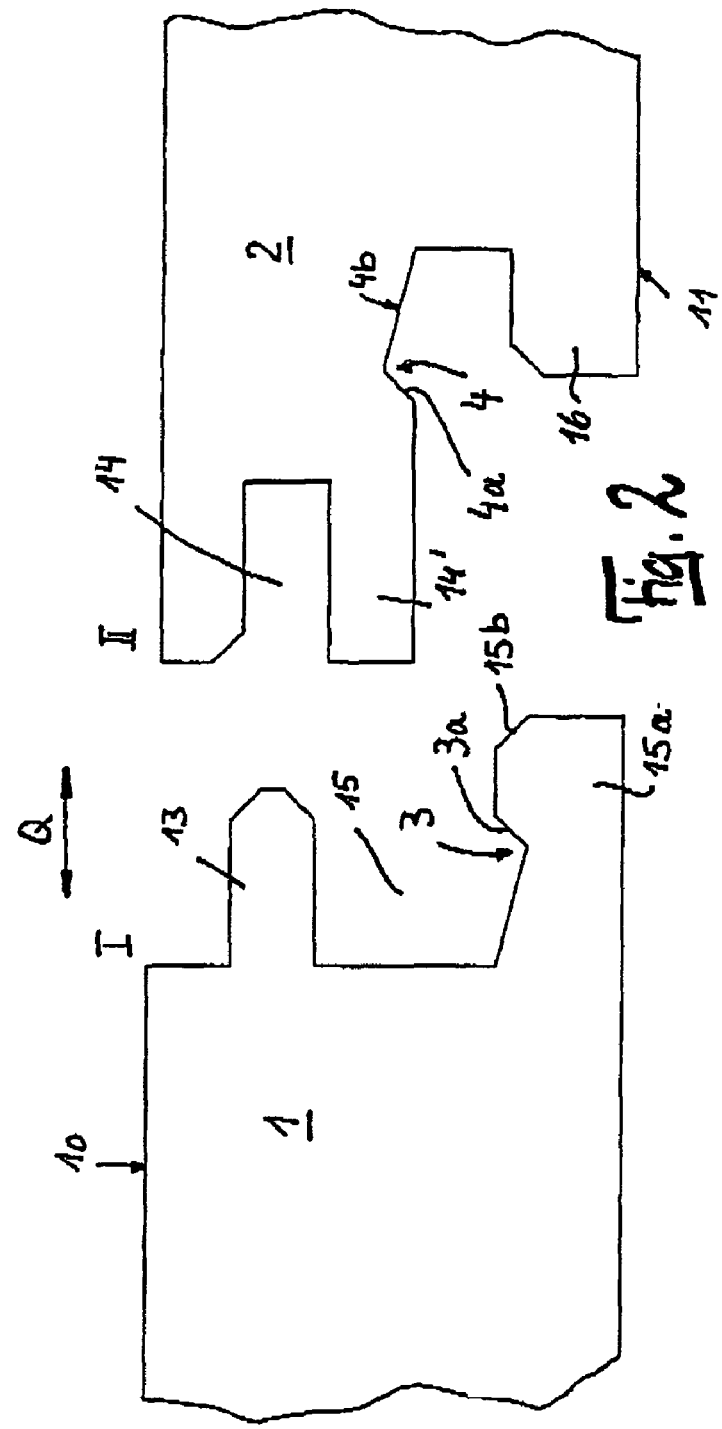

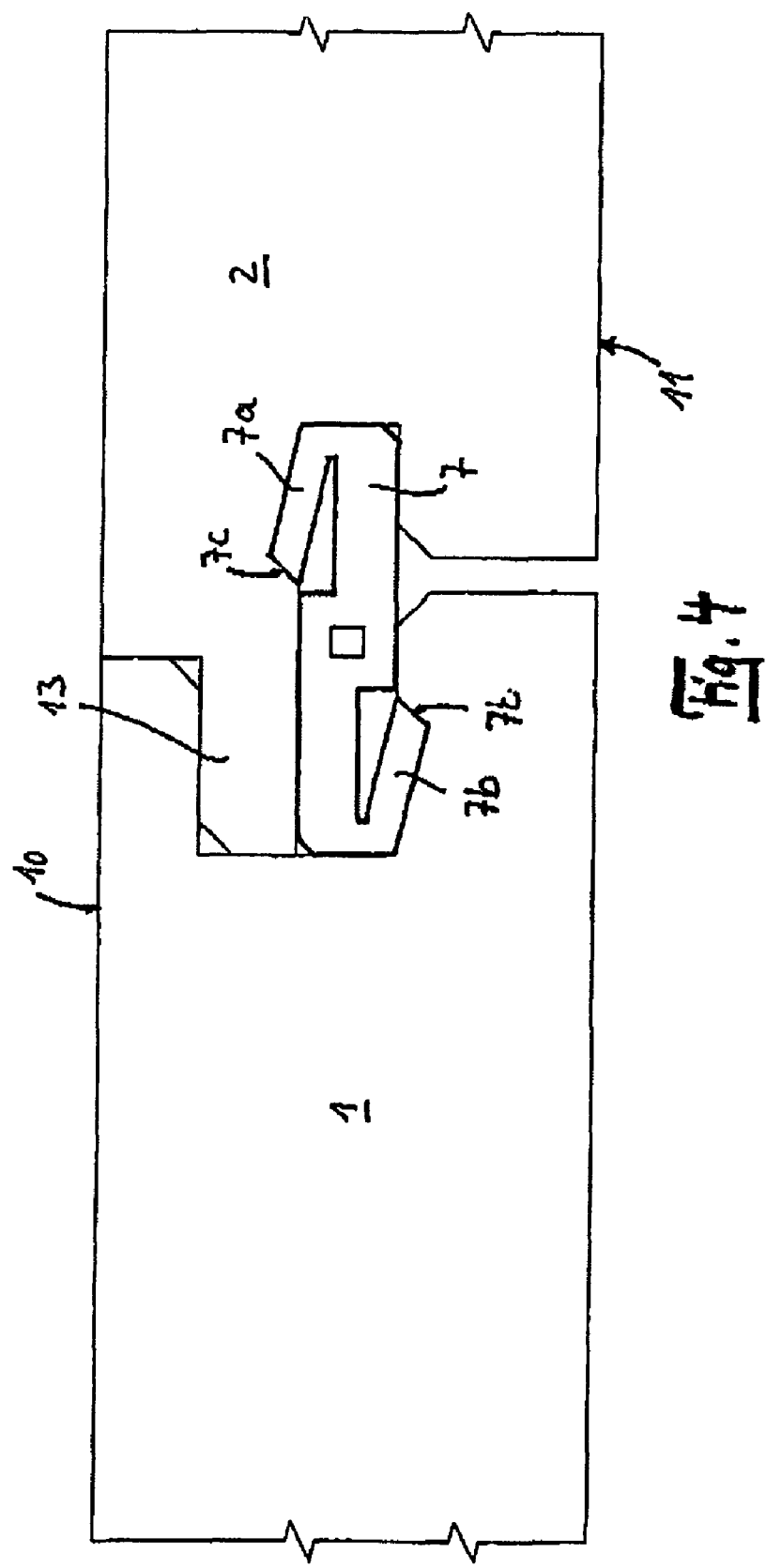

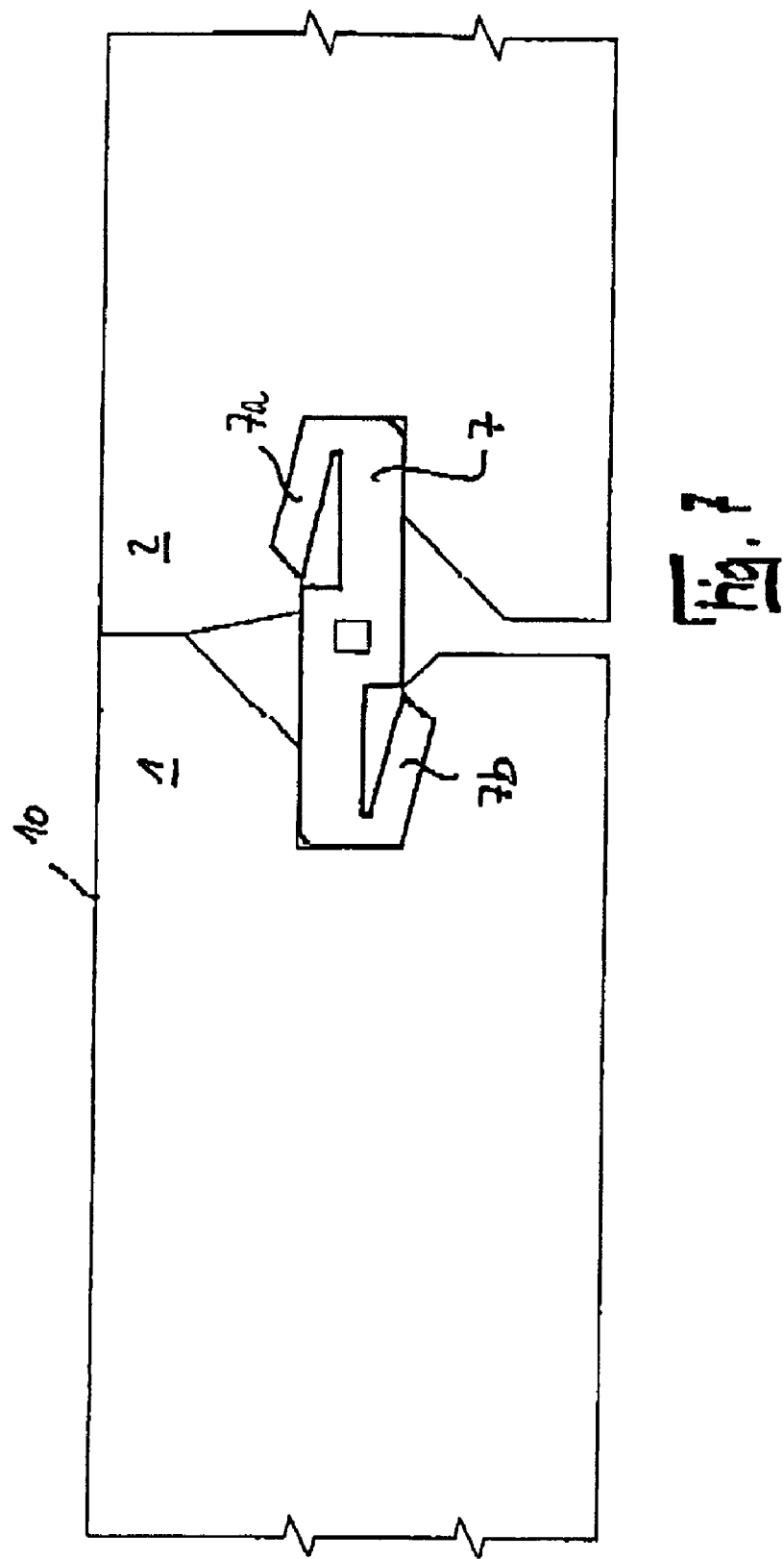

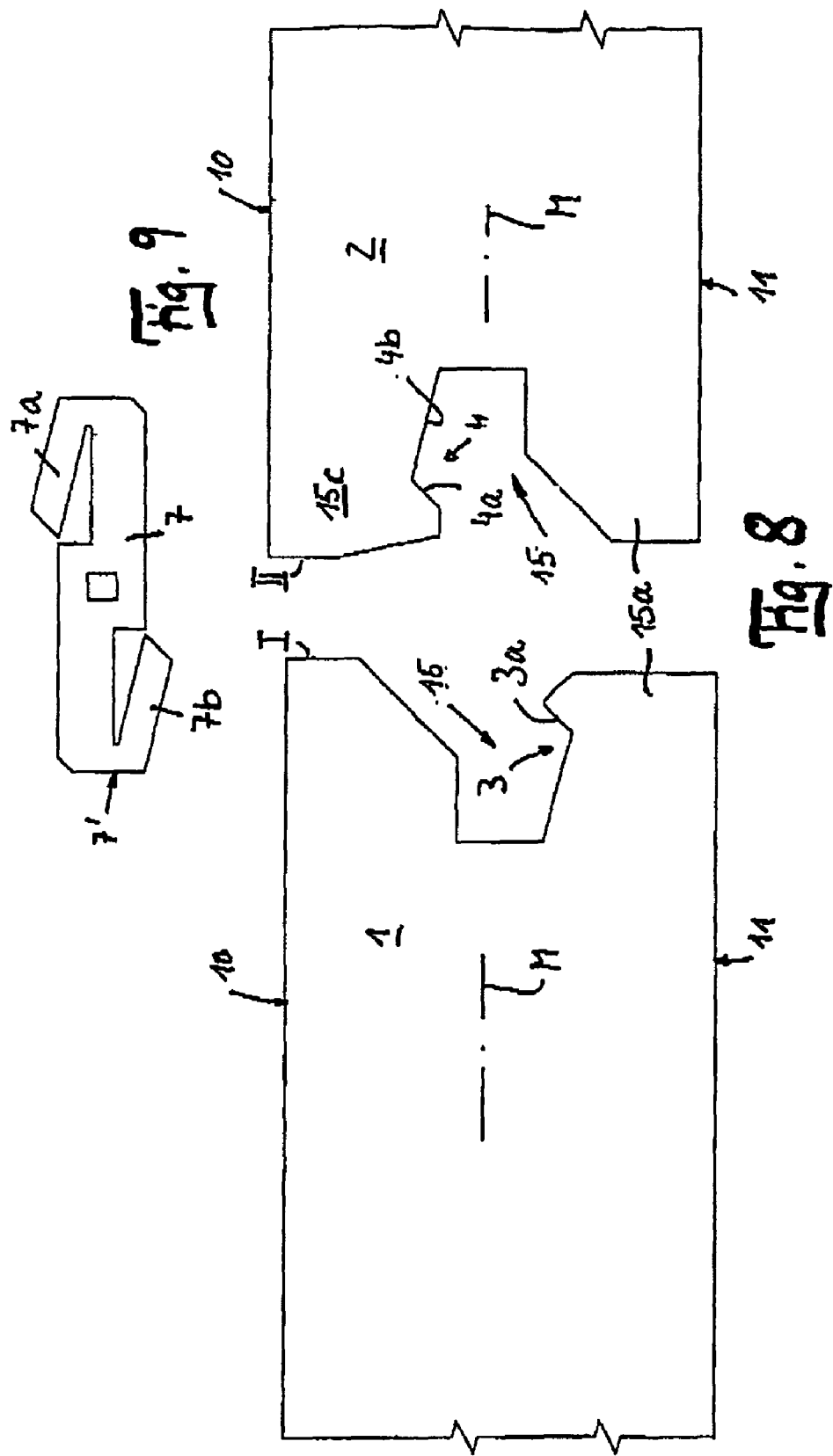

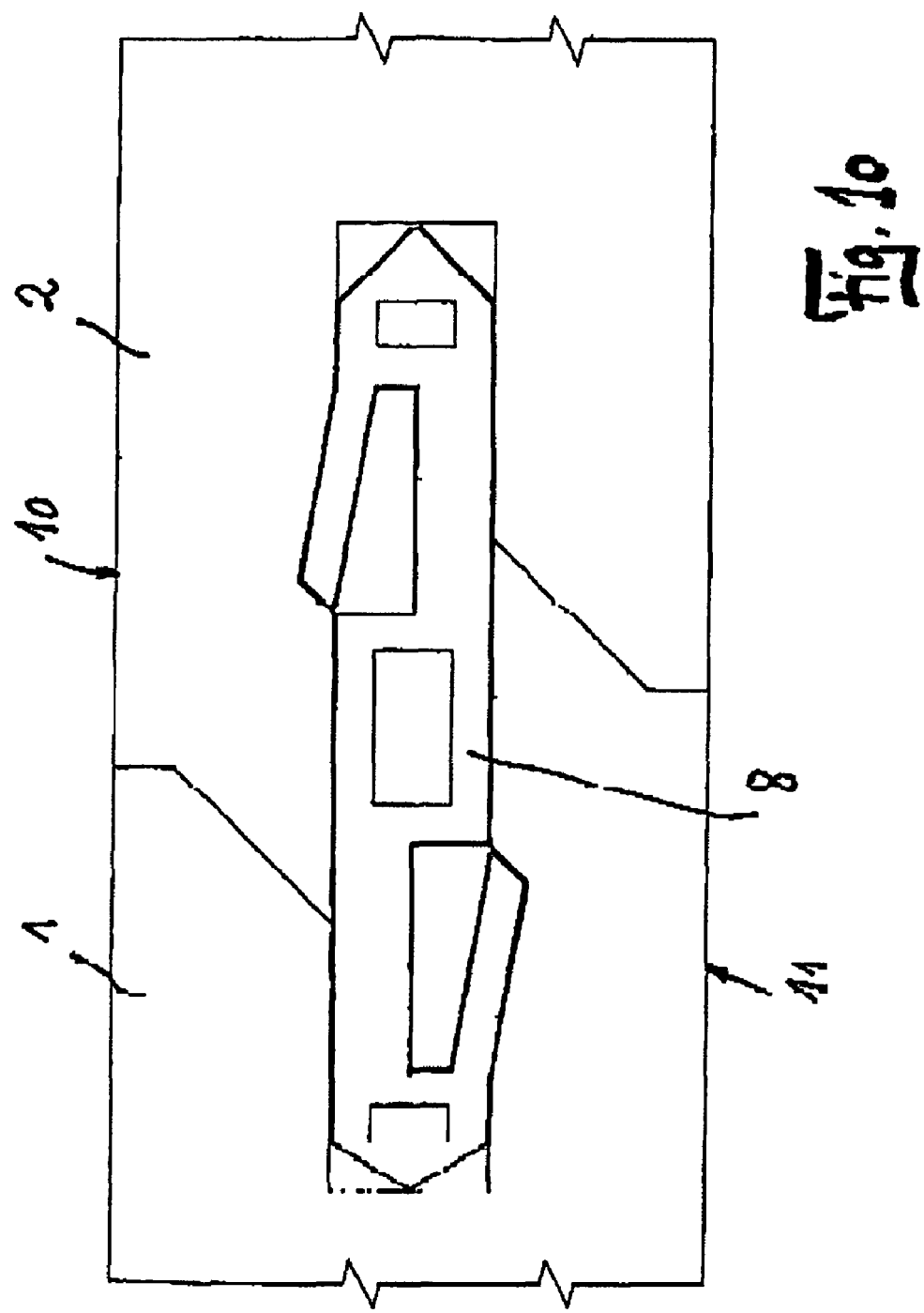

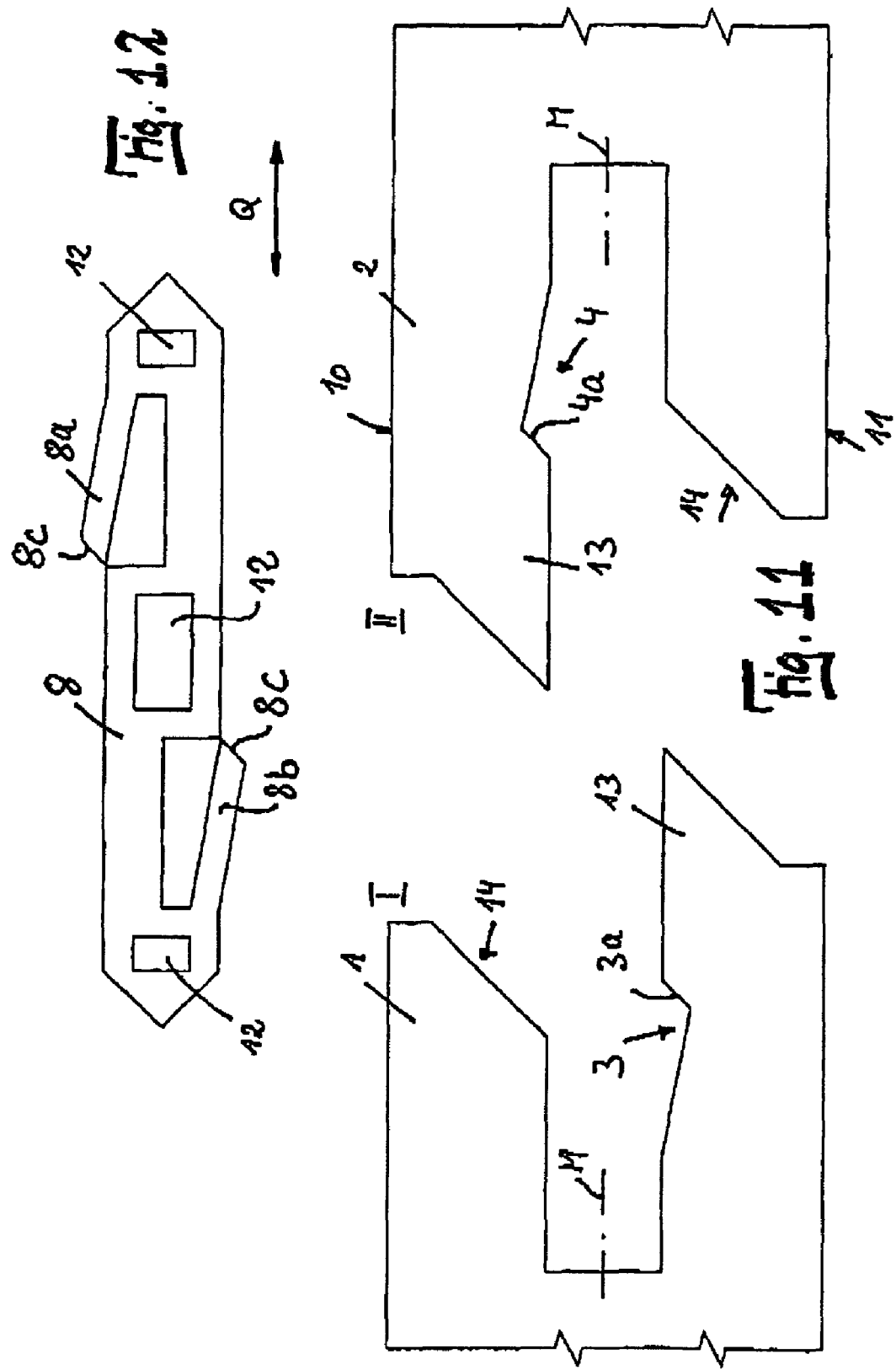

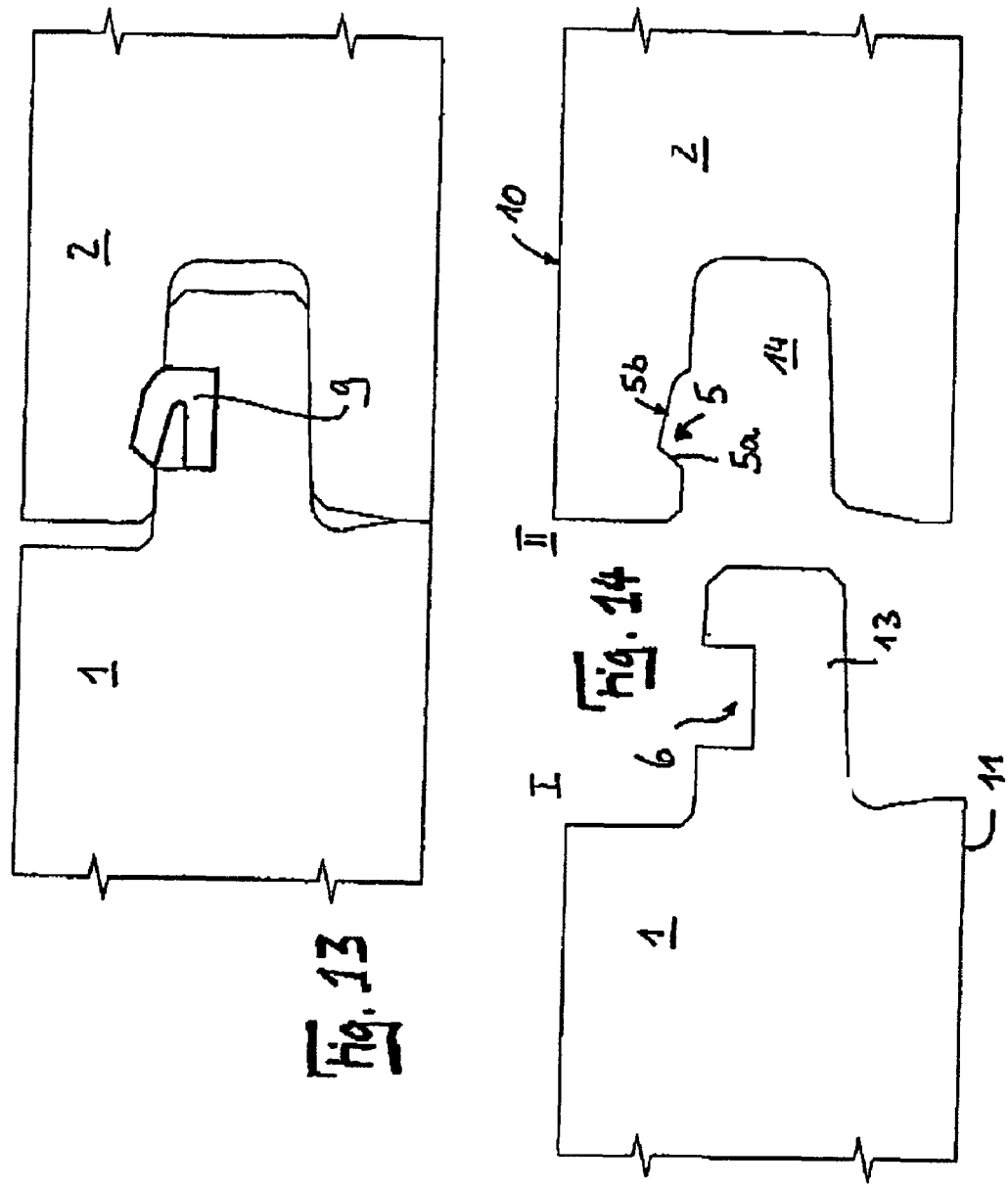

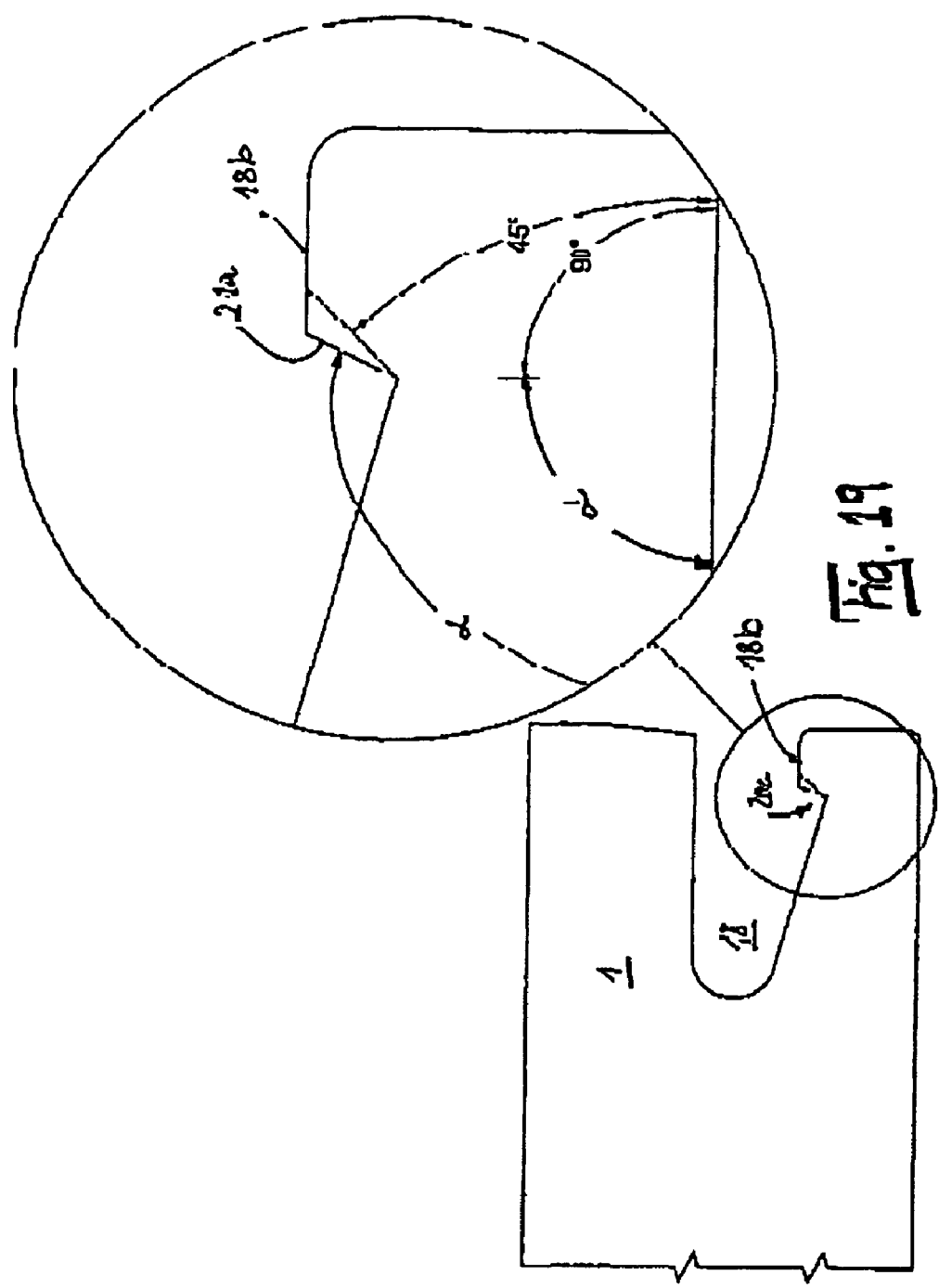

DEVICE FOR CONNECTING BUILDING BOARDS, ESPECIALLY FLOOR PANELS

CROSS REFERENCE TO RELATED APPLICATIONS

This application is a National Stage entry under 35 U.S.C. §371 of International Application PCT/DE2004/00148, which was filed on Jan. 30, 2004. Further, the present application claim priority under 35 U.S.C. §119 to German Patent Application No. 203 04 761.3, filed Mar. 24, 2003.

BACKGROUND OF THE INVENTION

1. Field of the Invention

The invention relates to a device for connecting and locking building boards comprising a top side and a bottom side, especially floor panels having a core made of wood material and provided with a groove on at least two opposite side edges, further comprising an insert intended for locking purposes, which insert can be inserted into the groove of one of the side edges, the boards being connected by substantially horizontal displacement.

2. Discussion of Background Information

Such a device is known, for example, from DE 100 34 409. On the insert, a plurality of barbs are formed in mirror symmetry about its center. The barbs are oppositely directed one to another. The insert is inserted into one of the grooves and the groove of the other panel then connected to the insert for connection purposes. The core of the insert corresponds to the groove height. The barbs project beyond the core. The locking is effected non-positively, in that the barbs are forced together in the groove. To prevent mutually connected boards from coming loose, the clamping forces must be high. This means that high joining forces are also necessary, which, particularly in the joining-together of floor panels, can only be applied if the panels are banged together with hammer blows.

Here there is the danger, in principle, that the last blow is administered too strongly and the side edge of the panel is then damaged. In the case of floor panels, any damage to the side edges is critical, since it possibly remains undiscovered and then absolute leak-tightness is unobtainable at the connecting joint. At such places, moisture can penetrate into the core of the panel. In the case of a laminate panel, the core consists of a wood material, which in this case can swell causing the floor to be destroyed.

SUMMARY OF THE INVENTION

Starting from this problem definition, the object of the invention is to provide a connecting and locking device as described in the introduction, which can be easily handled and is cheap to produce.

In order to solve these problems, the device of the generic type is distinguished by the fact that the insert is provided with at least one resilient lip directed toward the top side or the bottom side.

The insert is inserted into the groove on one side. The newly to be connected panel is pushed onto the insert, whereby the resilient lip is compressed. For locking, the lip then springs back, when it comes into overlap with the locking groove.

Preferably, the insert is provided with two resilient lips directed in opposite directions or toward the bottom side. Consequently, it can be easily connected to both panels. It is particularly advantageous if the insert is symmetrically configured, thereby reducing the production costs.

It is particularly advantageous if the resilient lip has a tip running obliquely to the top side and bottom side, which tip, for locking, cooperates with an obliquely running edge of the groove. The connection thereby becomes positive-locking and is fundamentally permanent.

The insert can be cheaply made if it consists of plastic. In order to save material and enhance the spring characteristics, it is advantageous if the insert has in its core at least one cavity. It is particularly advantageous if the insert has a multiplicity of cavities.

If the insert has midway between the resilient lips a projection which rests on a shoulder, running parallel to the bottom side, of the bottom lip of the grooves, a secure connection and locking of the panels is achieved, since the insert is prevented from being bent out by a twisting motion of the panels.

In order to obtain a precise-fitting connection of the boards also in the direction running perpendicular to the direction of connection (in the case of floorboards, the vertical direction), the board is provided on one side edge with a tongue pointing substantially in the transverse direction and on the other side edge with a groove corresponding thereto. The grooves into which the insert is inserted can be formed in the bottom lip of the groove and the bottom side of the tongue.

In order to avoid tilting in the joining-together of two boards, the side edges of the insert are tapered outward. They can be rounded or aligned such that they taper to a point. A conically tapered embodiment has the advantage that the boards are mutually aligned when they are connected.

It is advantageous if the insert is inserted into a groove at the factory and, particularly advantageously, is permanently connected to the latter. The handling of the boards during laying is thereby simplified. For permanent connection, the insert can be glued to the groove. In order further to improve the connection of the panels one to another, the grooves and the insert are configured such that, when the panels are mutually connected, the insert is essentially fully surrounded in its peripheral contour by the core material of the boards.

Preferably, the angle of inclination between the obliquely running edge measures between 90° and 135°. The thickness of the insert preferably measures 1.5 5 mm.

The connection has proved highly stable if the depth of penetration of the insert into the groove is 3-8 mm.

It is advantageous if the flexural modulus of the plastic from which the insert is made is 1000-7000 N/mm².

Since the top lip and the bottom lip of the grooves into which the insert is inserted end in the same vertical plane, it is advantageous if these are cut with a fixed tool past which the boards are led. The undercuts which produce the locking can thereby be produced cheaply.

BRIEF DESCRIPTION OF THE DRAWINGS

Illustrative embodiments of the invention are to be explained in greater detail below with the aid of a drawing, in which:

FIG. 1 shows the side view at the junction of two interlocked panels;

FIG. 2 shows the side edges of the panels according to FIG. 1 in the unlocked state;

FIG. 3 shows a first illustrative embodiment of an insert;

FIG. 4 shows the side view at the junction of two interlocked panels;

FIG. 8 shows the side edges of the panels according to FIG. 7 in the unlocked state;

FIG. 9 shows the insert in single representation;

FIG. 10 shows the side view at the junction of two interlocked panels;

FIG. 11 shows the side edges of the panels according to FIG. 10 in the unlocked state;

FIG. 12 shows a second illustrative embodiment of an insert;

FIG. 13 shows the side view at the junction of two interlocked panels;

FIG. 14 shows the side edges of the panels according to FIG. 13 in the unlocked state;

FIG. 15 shows a third illustrative embodiment of an insert;

FIG. 19 shows one of the panels with an enlarged detailed representation.

DETAILED DESCRIPTION OF THE PRESENT INVENTION

Figure 6:
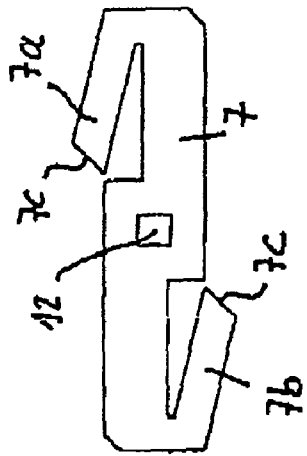
FIG. 6 shows the insert in single representation.

The laminate panels 1, 2 consisting of a core made of wood material, preferably MDF or HDF, are provided on their side edges I, II with a tongue 13 and a groove 14. Beneath the bottom lip 14' of the groove 14, the material of the panel 2 is milled away down to the bottom side 11. Beneath the tongue 13 there is formed, on the opposite side edge I, a groove 15 having a bottom lip 15a. On its side facing the tongue 13, the bottom lip 15a is provided with a groove 3, which has an obliquely running edge 3a. On the opposite side edge II, the bottom side of the bottom lip 14a is likewise provided with a groove 4, which has an obliquely running edge 4a.

As shown by FIG. 3, the insert 7 serving for the locking is provided with two opposite-acting resilient lips 7a, 7b, which are provided with an obliquely running tip 7c. The insert 7 is configured symmetrical to two principal axes. In the center, it is provided with a cavity 12.

For the connection of the two panels 1, 2, the insert 7 is firstly inserted with the resilient lip 7a into the groove 4, where it rests with the tip 7c against the obliquely running edge 4a and with its bottom side 7d against the further bottom lip 16. For secure fixing, the insert 7 can be stuck in place.

The panels 1, 2 are now pushed horizontally together in the transverse direction Q. When the tip 7' enters the groove 15, the bottom side of the resilient lip 7b runs up against the stop slope 15b of the bottom lip 15a and the resilient lip 7b is compressed. When the panels 1, 2 are pushed close enough together, the resilient lip 7b comes under the influence of the groove 3 and springs back. Its tip 7c engages in the groove and locks with the oblique edge 3a. In the transverse direction Q, the panels 1, 2 are locked via the insert. In the vertical direction, the guidance and locking is effected, supportingly, via the tongue 13 and the groove 14.

Figure 5:
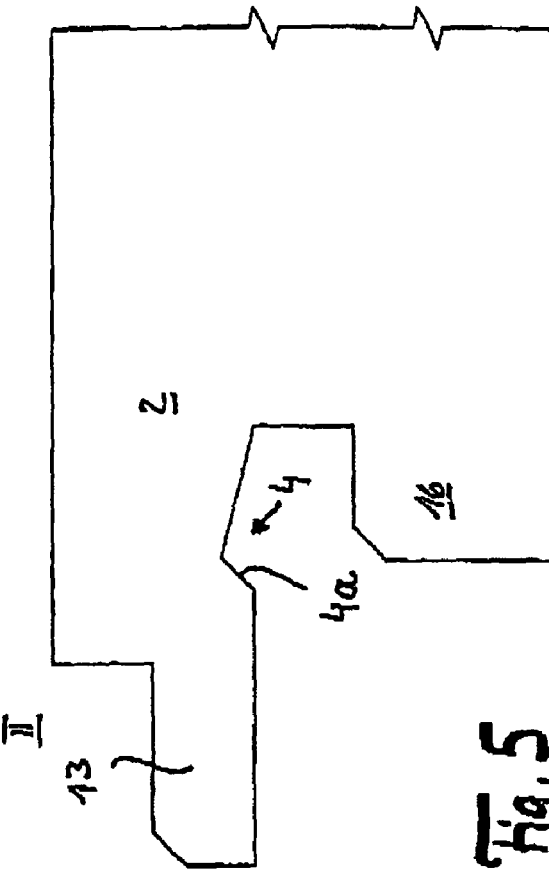
FIG. 5 shows the side edges of the panels according to FIG. 4 in the unlocked state.

The panels 1, 2 shown in FIGS. 4 and 5 are provided on the side edges 1, 2 with a somewhat differently shaped profiling of the tongue 13 and the groove 14. The locking is effected via an identically configured insert 7, as shown by FIG. 6.

Figure 7:
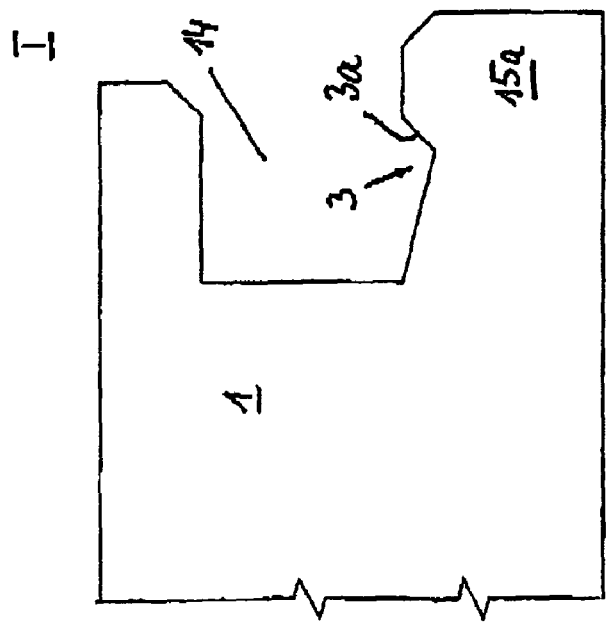
FIG. 7 shows the side view at the junction of two interlocked panels.
Figure 16:
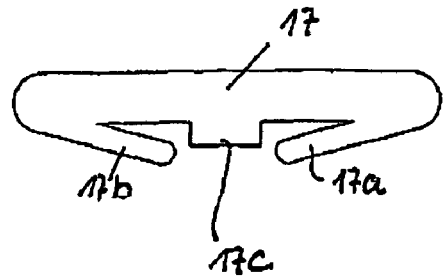
FIG. 16 shows a fourth illustrative embodiment of an insert.
Figure 17:
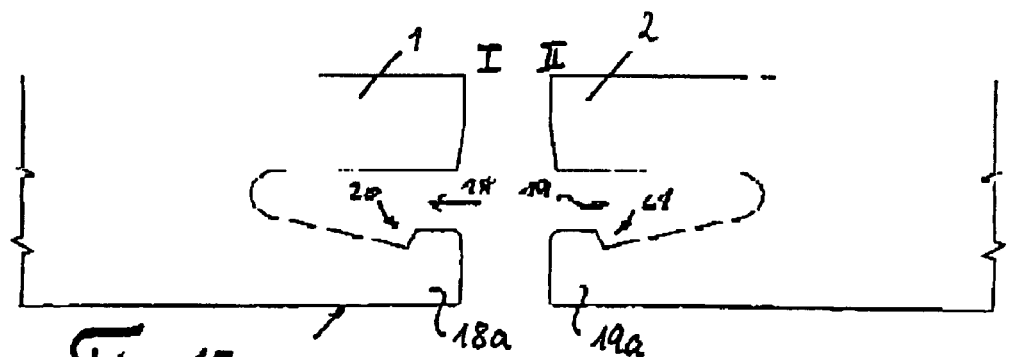
FIG. 17 shows the side edges of the panels intended for connection to the insert according to FIG. 16.

The panels 1, 2 shown in FIGS. 7 and 8 are configured at their opposite side edges I, II with identical grooves 15, which are mirrored about the center axis M. The grooves 3, 4 for locking purposes are formed on the bottom lip 15a and the top lip 15c of the grooves 15. The locking is effected with the previously described locking element 7, as shown by FIG. 9.

FIG. 12 shows a further insert 8. This insert 8 is likewise symmetrical in two principal axes and is provided with opposite-acting resilient lips 8a, 8b, which respectively have an obliquely running tip 8c.

On the side edges, the insert 8 is tapered. The panels 1, 2 (FIG. 11) are provided with identically shaped grooves 14 mirrored about the center axis M. The tongues 13 form on one side edge I the bottom lip and on the opposite side edge the top lip of the groove 14.

The grooves 3, 4 for locking purposes are provided in the tongue 13. The locking principle corresponds to that which is described above. The insert 8 is inserted into one of the grooves and fixed therein. The two panels are then connected together by displacement in the transverse direction.

With reference to FIGS. 13-15, a third illustrative embodiment of an insert 9 is now described. The insert 9 has a resilient lip 9a, which has an obliquely running tip 9c.

On one side edge I, the panel 1 is provided with a tongue 13, which on its top side is provided with a groove 6 of rectangular cross section. On the opposite side edge II, a groove 14 is milled into the panel 2. The groove 14 has on the bottom side of its top lip a groove 5 having an oblique edge 5a.

The lower lip 9' of the insert 9 is matched in cross section to the groove 6. The insert 9 is inserted into the groove 6 and the connection is effected by relative displacement of the panels 1, 2 one to another. As in the case of the previously described inserts 7, 8, the top lip 9a of the insert 9 also runs at an angle relative to the top side 10 of the panel 1, 2. The angle of inclination of the top side of the resilient lip 9a corresponds to the angle of inclination of that edge 5b of the groove 5 which adjoins the edge 5a. If the resilient lip 9a comes into overlap with the groove 5, it springs back out and the tip 9c reaches behind the oblique edge 5a, whereby the locking is effected. The vertical locking is effected via the tongue 13 and the groove 14.

FIGS. 16-19 illustrate a further illustrative embodiment of the device. On their opposite side edges I, II, the panels 1, 2 are provided with grooves 18, 19 of mirror-inverted design, the top lip and bottom lip 18a, 19a of which end in a vertical plane. The insert 17 consists of plastic and has at its outer ends resilient lips 17a, 17b which run obliquely downward and the ends of which are rounded. Jutting out from the core of the insert 17, between the resilient lips 17a, 17b, is a projection 17c, having a face running parallel to the top side of the insert 17.

Figure 18:
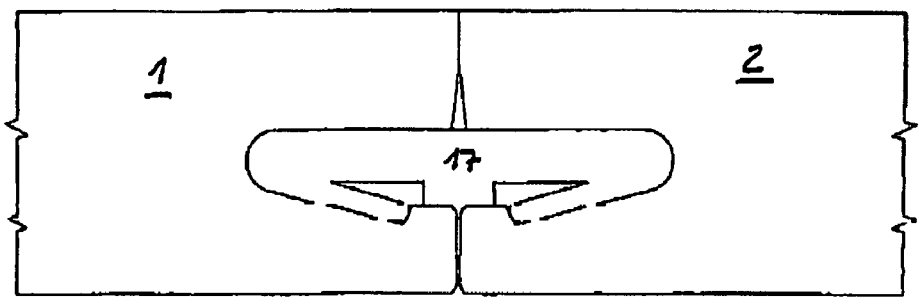
FIG. 18 shows the side edges of the panels according to FIG. 17 in the locked state.

FIG. 18 shows that, when the panels 1, 2 are mutually connected, the insert 17 is essentially fully surrounded by the core material of the panels 1, 2, only the region within the resilient lips 17a, 17b up to the transversely running crosspiece of the insert 17 being excluded. The obliquely running edge 20a, 21a which is formed in the recess 20, 21 so as to be able to lock the insert 17 via the lips 17a, 17b runs at an angle of inclination of 90°-135° relative to the bottom side 11 (if the internal measurements are determined in the manner shown in the enlarged representation in FIG. 19, the angle of inclination measures 90°-45°). The projection 17c rests on the crosspiece 18b, 19b, running parallel to the bottom side 11, of the bottom lip 18a, 19a.

Good stability of the connection is obtained if the depth of penetration of the insert 7 into the grooves 18 is 3-8 mm. The flexural modulus of the insert is 1000-7000 N/mm².

The top lip and the bottom lips 18a, 19a of the grooves 18, 19 end in the same vertical plane. In order to form the undercut through the recess 20, 21, it is advantageous if a fixed blade is used, past which the boards 1, 2 are led. The grooves 18, 19 are therefore not milled, but cut. The production is thereby simplified and made cheaper.

The invention claimed is:

1. A device for connecting and locking building boards comprising a top side and a bottom side, having a core made of wood material and provided with a groove on at least two opposite side edges, comprising an insert intended for locking purposes, which insert can be inserted into the groove of one of the side edges, the boards being connected by substantially horizontal displacement one toward the other, wherein the insert is provided with one resilient lip extending upward from a first side edge directed toward the top side of the insert, and another resilient lip extending downward from a second side edge directed toward the bottom side of the insert, and
    wherein at least one of the one resilient lip and the another resilient lip compresses toward a center of the insert and then springs back out from the center of the insert when the boards are connected by the substantially horizontal displacement,
    the insert comprises:
        a first upward facing surface;
        a second upward facing surface connected to, and vertically offset from, the first upward facing surface by a first step;
        a first downward facing surface;
        a second downward facing surface connected to, and vertically offset from, the first downward facing surface by a second step;
        the first side edge comprises the second upward facing surface and the first downward facing surface;
        the second side edge comprises the first upward facing surface and the second downward facing surface;
        the one resilient lip extends upward from the second upward facing surface; and
        the another resilient lip extends downward from the second downward facing surface,
        wherein each resilient lip has a tip running obliquely to the top side and bottom side, which tip, for locking, cooperates with an obliquely running edge,
        the insert is plastic,
        the insert has in its core at least one cavity at a center of the insert,
        the angle of inclination between the obliquely running edge measures between 90° and 135°,
        the thickness of the insert measures 1.5-5 mm,
        the depth of penetration of the insert into the groove is 3-8 mm, and
        the flexural modulus of the plastic is 1000-7000 N/mm².

2. The device as claimed in claim 1, wherein the one and another resilient lips are directed in opposite directions.

3. The device as claimed in claim 1, wherein the insert has midway between the one and another resilient lips a projection which rests on a shoulder, running parallel to the bottom side of the bottom lip of the groove.

4. The device as claimed in claim 1, wherein when the building boards are mutually connected, the insert is essentially fully surrounded in its peripheral contour by the core material of the boards.

5. The device as claimed in claim 1, wherein the board is provided on one side edge with a tongue pointing substantially in the transverse direction and on the other side edge with a groove corresponding thereto.

6. The device as claimed in claim 1, wherein the side edges of the insert taper outward.

7. The device as claimed in claim 6, wherein the side edges of the insert are rounded.

8. The device as claimed in claim 6, wherein the side edges of the insert run conically.

9. The device as claimed in claim 1, wherein the insert is inserted into a groove at the factory.

10. The device as claimed in claim 9, wherein the insert is permanently connected to the groove of one of the side edges.

11. The device as claimed in claim 10, wherein the insert is glued in place.

12. The device as claimed in claim 1, wherein the grooves are cut with a fixed tool past which the boards are led.

13. The device as claimed in claim 1, wherein:
    the one resilient lip extends from the first side edge toward a center of the insert and has a length greater than half the distance between the first side edge and the center of the insert, and
    the another resilient lip extends from the second side edge toward the center of the insert and has a length greater than half the distance between the second side edge and the center of the insert.

14. The device as claimed in claim 13, wherein each of the one and another resilient lips includes:
    a fixed end attached to a body of the insert,
    a free end opposite the fixed end, and
    an oblique tip at the free end, which, for locking, is structured and arranged to cooperate with an obliquely running edge of the building board.

15. The device as claimed in claim 13, wherein the insert comprises:
    an upper surface step-shaped profile that allows the first resilient lip to be compressed; and
    a lower surface step-shaped profile that allows the second resilient lip to be compressed.

16. The device as claimed in claim 1, wherein when the building boards are mutually connected:
    the insert is essentially fully surrounded in its peripheral contour by the core material of the building boards, and
    an upper surface of the insert abuts a lip of one of the building boards, the lip defining a groove that receives a tongue of another one of the building boards.

17. The device as claimed in claim 1, wherein:
    the one resilient lip extending upward from the first side edge is the only lip that extends upward from the first side edge, and
    the another resilient lip extending downward from the second side edge is the only lip that extends downward from the second side edge.

18. The device as claimed in claim 17, wherein:
    each resilient lip has a tip running obliquely to the top side and bottom side, the tip, for locking, cooperates with an obliquely running edge,
    when the boards are mutually connected, the insert is essentially fully surrounded in its peripheral contour by the core made of wood material of the boards,
    the insert comprises a core having at least one cavity, and
    the board is provided on one side edge with a tongue pointing substantially in the transverse direction and on the other side edge with a groove corresponding thereto.

19. The device as claimed in claim 1, wherein:
    the one resilient lip is the only lip that extends from the first side edge, and
    the another resilient lip is the only lip that extends from the second side edge.

20. The device as claimed in claim 1, wherein:
    the first step comprises a first straight wall extending from the first upward facing surface to the second upward facing surface; and the second step comprises a second straight wall extending from the first downward facing surface to the second downward facing surface.

21. The device as claimed in claim 20, wherein when the first and second boards are mutually connected:
the first upward facing surface of the insert contacts a lip or tongue of the first board, and
the first upward facing surface of the insert of the insert and the lip or tongue of the first board are disposed within the groove of the second board.

22. A device in combination with building boards for connecting and locking the building boards comprising a top side and a bottom side, having a core made of wood material and provided with a groove on at least two opposite side edges, comprising an insert intended for locking purposes, which insert can be inserted into the groove of one of the side edges, the boards being connected by substantially horizontal displacement one toward the other, wherein the insert is provided with one resilient lip extending upward from a first side edge directed toward the top side of the insert, and another resilient lip extending downward from a second side edge directed toward the bottom side of the insert, and
wherein at least one of the one resilient lip and the another resilient lip compresses toward a center of the insert and then springs back out from the center of the insert when the boards are connected by the substantially horizontal displacement,
the insert comprises:
a first upward facing surface;
a second upward facing surface connected to, and vertically offset from, the first upward facing surface by a first step;
a first downward facing surface;
a second downward facing surface connected to, and vertically offset from, the first downward facing surface by a second step;
the first side edge comprises the second upward facing surface and the first downward facing surface;
the second side edge comprises the first upward facing surface and the second downward facing surface;
the one resilient lip extends upward from the second upward facing surface; and
the another resilient lip extends downward from the second downward facing surface, wherein when the boards are mutually connected:
an upper surface of the top side of the insert contacts a lip or tongue of a first one of the boards, and
the upper surface of the top side of the insert and the lip or tongue of the first one of the boards are disposed within the groove of a second one of the boards.

23. A device for connecting and locking first and second building boards, the first and second building boards comprising respective grooves into which the device is configured to be inserted for the connecting and locking, the first and second building boards being connected by substantially horizontal displacement one toward the other, the device comprising:
a first upward facing surface;
a second upward facing surface connected to, and vertically offset from, the first upward facing surface by a first step comprising a first vertical wall extending from the first upward facing surface to the second upward facing surface;
a first downward facing surface;
a second downward facing surface connected to, and vertically offset from, the first downward facing surface by a second step comprising a second vertical wall extending from the first downward facing surface to the second downward facing surface;
a resilient lip extending upward from the second upward facing surface; and
another resilient lip extending downward from the second downward facing surface,
wherein at least one of the resilient lip and the another resilient lip compresses toward a center of the device and then springs back out from the center of the device when the boards are connected by the substantially horizontal displacement; and
horizontal locking of the boards is effectuated by respective tips of the resilient lip and the another resilient lip resting against respective edges of the respective grooves.

24. The device as claimed in claim 23, further comprising a cavity in a core of the insert.

25. The device as claimed in claim 24, wherein the cavity is at a center of the insert.

26. The device as claimed in claim 25, wherein when the first and second building boards are mutually connected:
the first upward facing surface of the insert contacts a lip or tongue of the first building board, and
the first upward facing surface of the insert of the insert and the lip or tongue of the first building board are disposed within the groove of the second building board.

27. The device as claimed in claim 26, wherein:
each resilient lip has a tip running obliquely to the top side and bottom side, which tip, for locking, cooperates with an obliquely running edge,
the insert is plastic,
the insert has in its core at least one cavity at a center of the insert,
the angle of inclination between the obliquely running edge measures between 90° and 135°,
the thickness of the insert measures 1.5-5 mm,
the depth of penetration of the insert into the groove is 3-8 mm, and
the flexural modulus of the plastic is 1000-7000 N/mm$^2$.

28. A device for connecting and locking building boards comprising a top side and a bottom side, having a core made of wood material and provided with a groove on at least two opposite side edges, comprising an insert intended for locking purposes, which insert can be inserted into the groove of one of the side edges, the board being connected by substantially horizontal displacement one toward the other, wherein the insert is provided with one resilient lip extending upward from a first side edge directed toward the top side of the insert, and another resilient lip extending downward from a second side edge directed toward the bottom side of the insert, and wherein at least one of the one resilient lip and the another resilient lip compresses toward a center of the insert and then springs back out from the center of the insert when the boards are connected by the substantially horizontal displacement, the insert comprises: a first upward facing surface; a second upward facing surface connected to, and vertically offset from, the first upward facing surface by a first step; a first downward facing surface; a second downward facing surface connected to, and vertically offset from, the first downward facing surface by a second step; the first side edge comprises the second upward facing surface and the first downward facing surface; the second side edge comprises the first upward facing surface and the second downward facing surface; the one resilient lip extends upward from the second upward facing surface, and the another resilient lip extends downward from the second downward facing surface, and wherein when the boards are mutually connected an upper surface of the top side of the insert contacts a lip or tongue of a first one of the boards, and the upper surface of the top side of the insert and the lip or tongue of the first one of the boards are disposed within in the groove of a second one of the boards; and wherein:

the first step comprises a first straight wall extending from the first upward facing surface to the second upward facing surface; and the second step comprises a second straight wall extending from the first downward facing surface to the second downward facing surface.

* * * * *